United States Patent [19]

Arnett

[11] 4,106,737
[45] Aug. 15, 1978

[54] BOAT BRACKET

[76] Inventor: Roy L. Arnett, 278 Morningview Ave., Akron, Ohio 44305

[21] Appl. No.: 781,566

[22] Filed: Mar. 28, 1977

[51] Int. Cl.² ............................................. A47F 5/00
[52] U.S. Cl. ................................. 248/226.4; 248/229; 248/310
[58] Field of Search ..................... 248/214, 226.4, 229, 248/310; 240/57.1

[56] References Cited

U.S. PATENT DOCUMENTS

| 111,813 | 2/1871 | Campbell | 248/310 |
|---|---|---|---|
| 1,227,738 | 5/1917 | Bellis et al. | 248/229 X |
| 2,430,161 | 11/1947 | Csencsics | 248/226.4 |
| 2,531,626 | 11/1950 | Hull | 248/310 |
| 2,540,584 | 2/1951 | Jaycox | 248/229 X |
| 2,559,003 | 7/1951 | Brow | 248/310 X |
| 2,872,146 | 2/1959 | Kukla | 248/229 |
| 2,875,974 | 3/1959 | Albert | 248/229 |
| 3,096,961 | 7/1963 | Powell | 248/229 |
| 3,189,305 | 6/1965 | Willenborg | 248/229 X |
| 4,030,691 | 6/1977 | Fleshman | 248/226.4 X |

FOREIGN PATENT DOCUMENTS

| 455,216 | 11/1925 | Fed. Rep. of Germany | 248/310 |
|---|---|---|---|
| 662,672 | 12/1951 | United Kingdom | 248/226.4 |

Primary Examiner—Lawrence J. Staab
Attorney, Agent, or Firm—Mack D. Cook, II

[57] ABSTRACT

A bracket for an open boat having a hull with a tubular gunwale. The bracket comprises a deformable strap fitted around the gunwale and clamped thereto. The bracket includes a load carrying base member extending laterally outboard of the bracket strap and adapted for carrying various devices, including a lantern.

3 Claims, 3 Drawing Figures

BOAT BRACKET

BACKGROUND OF THE INVENTION

The invention relates to a bracket for supporting objects used on or in fishing boats by fishermen. More particularly, the invention relates to a bracket for use on a metal, usually aluminum, boat having a hull framed by a tubular gunwale or gunnel or side rail.

The preferred embodiment of the invention as disclosed herein is particularly adapted for supporting a gas lantern when night fishing. In other embodiments, the laterally projecting base members could be used to attach a boat cover, as tie-downs to a car top rack, to hold fenders or bumpers, to mount navigation lights or batteries, oar locks, or fishing baskets; virtually any useful object which could or should be attached, permanently or temporarily, to a small, light boat.

Prior art patents particularly relevant to a boat bracket and support according to the invention include U.S. Pats. Nos. 2,531,626; 2,559,003; 2,655,337; 2,813,196; 2,875,974; 2,960,601; and, 3,752,108. A recent U.S. Pat. No. 3,844,519, Class 248/226 R discloses a relatively complex form of a holder for a boat lantern. Two earlier U.S. Pats. Nos. 1,182,706 and 2,313,115, are generally relevant as disclosing supports which could be mounted by a bracket according to the invention.

A boat bracket according to the invention is light in weight, inexpensive to manufacture, easy to maintain in good repair, having only one moving part. Such a bracket has a wide variety of uses enabling a fisherman to transport, use and enjoy his boat to the fullest extent.

SUMMARY OF THE INVENTION

It is an object of the invention to provide an improved boat bracket.

It is a further object of the invention to provide a bracket for use on a metal boat having a hull framed by a tubular gunwale and for attaching useful articles, including a gas lantern.

These and other objects of the invention, and the advantages thereof, will be apparent in view of the description of a preferred embodiment, as set forth below.

In general, a bracket according to the invention is used on an open boat having a hull with a tubular gunwale. A bracket comprises a deformable strap having inner and outer ends and a medial portion adapted for conforming engagement with the upper and outer surfaces of the tubular gunwale. The strap inner end has an inverted L-shaped providing a span portion extending laterally inward of the strap medial portion and a downwardly projecting terminal portion. The terminal portion has a tapped bore therein for receiving the threads of a rotatable bolt projecting through the bore for adjustable engagement with the inner surface of the hull beneath the tubular gunwale. The strap outer end is in engagement with the outer surface of the hull beneath the tubular gunwale. An elongate load carrying member is integrally attached to and extends laterally outward of the strap medial portion.

DETAILED DESCRIPTION OF THE INVENTION

Figure 1:
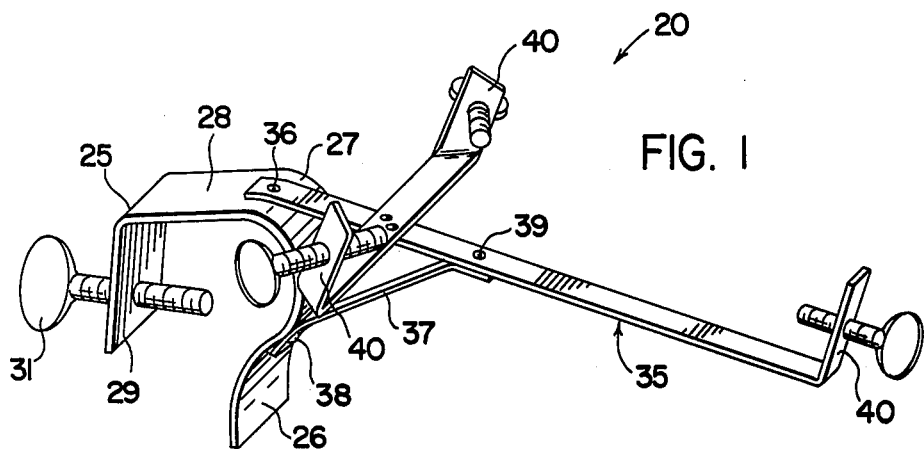
FIG. 1 is a perspective view of a boat bracket according to the invention.
Figure 2:
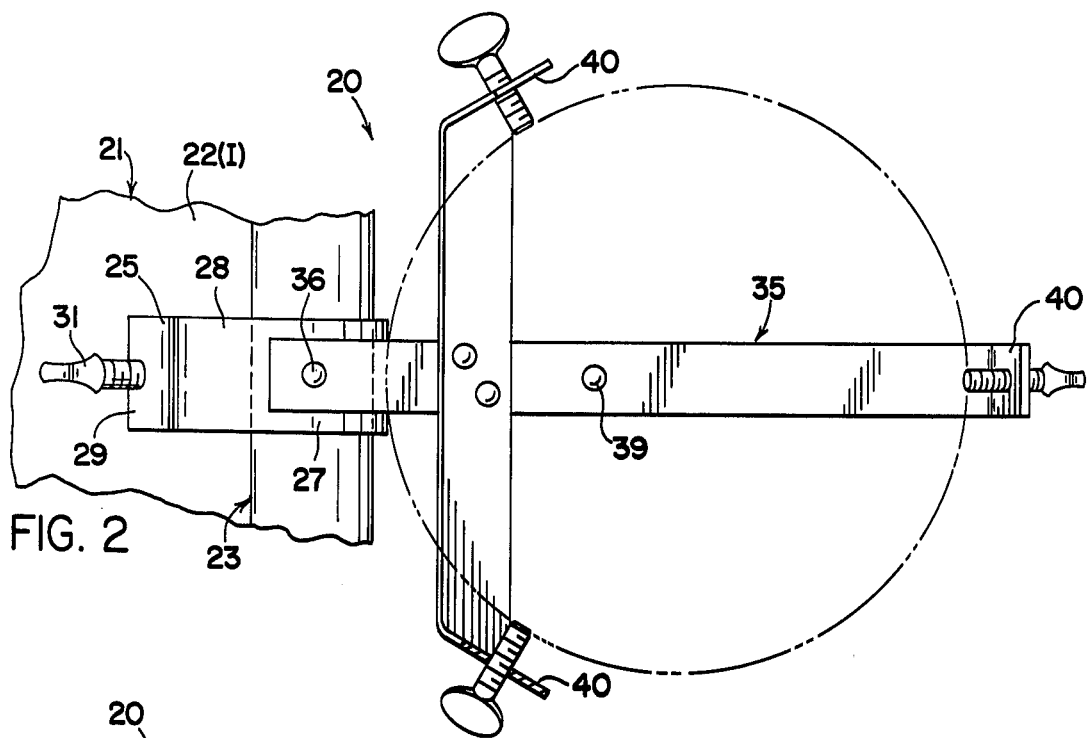
FIG. 2 is a plan view of the bracket.

A bracket according to the invention is referred to generally by the numeral 20. A bracket 20 is used on an open boat, referred to generally by the numeral 21. The boat 21 has a hull 22, with inner and outer surfaces 22 (I) and 22 (O), framed by a tubular gunwale indicated at 23.

Figure 3:
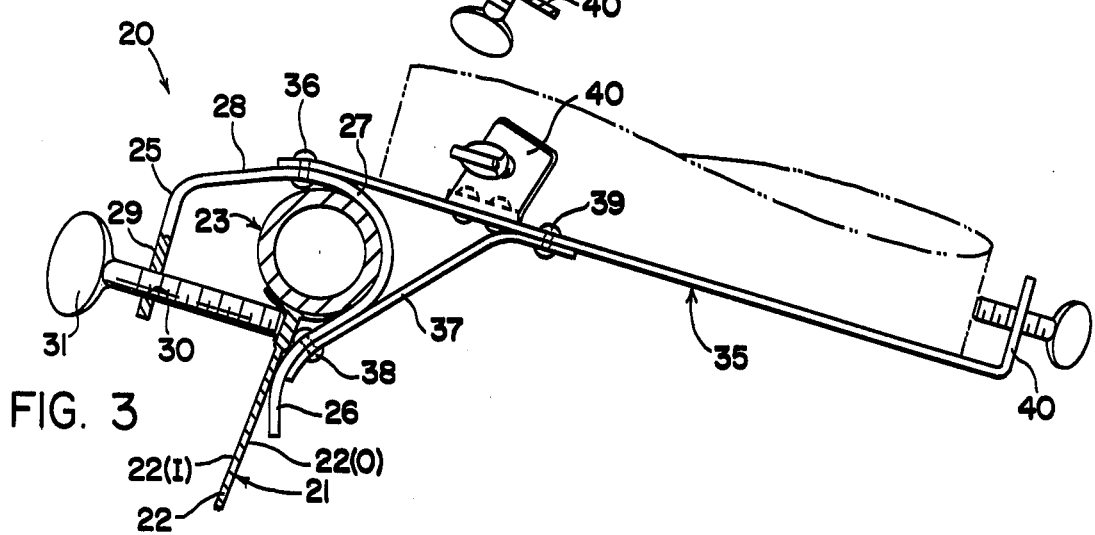
FIG. 3 is an elevation showing the bracket mounted on a boat having a hull framed by a tubular gunwale.

A bracket 20 comprises a deformable strap having an inner end indicated at 25, an outer end indicated at 26, and a medial portion indicated at 27 connecting the ends 25 and 26. The medial portion 27 is pre-formed or shaped for conforming or contacting engagement with the upper and outer surfaces of a gunwale 23, as best shown in FIG. 3.

The deformable strap is fabricated or made from a rectilinear elongated strip or piece of metal having a substantially uniform cross-section throughout the extent or length thereof from end to end.

The strap inner end 25 has an inverted L-shape providing a span portion 28 extending laterally inward of a medial portion 27 and a downwardly projecting terminal portion 29. The terminal portion 29 has a tapped bore 30 therein for receiving the peripheral threads of a rotatable bolt 31 projecting through the bore 30 for adjustable engagement with the inner hull surface 22 (I) beneath the gunwale 23.

When the bolt 31 is in engagement with the inner hull surface 22 (I), the medial portion 27 is in engagement with the upper and outer surfaces of the gunwale 23, and the strap outer end 26 is in engagement with the outer hull surface 22 (O) beneath the gunwale 23.

An elongate or extended load carrying member is referred to generally by the numeral 35. The member 35 is integrally attached to, as by a rivet 36, and extended laterally outward of the strap medial portion 27. Optionally, a support strut 37 extends between and is integrally attached to, as by rivets 38 and 39, to both the strap outer end 26 and the base member 35.

As shown, the elongate base member 35 may carry thereon a set of concentrically positioned clamp elements indicated at 40 for engaging the base of a lantern. Alternatively, the base member 35, with or without the support strut 37, may be readily adapted to carry a snap for a boat cover, a ring for tie-down or connection of fenders or bumpers, brackets for mounting navigation lights or batteries, pins for oar locks or snaps for a fishing basket; any useful article which could be attached to a boat 21 outboard of the hull 22.

What is claimed is:

1. A bracket for use on an open boat having a hull with a tubular gunwale, said bracket comprising a deformable strap having inner and outer ends and a medial portion adapted for conforming engagement with the upper and outer surfaces of said tubular gunwale, said strap being fabricated from a rectilinear elongated strip having a substantially uniform cross-section throughout the extent thereof from end to end, said strap inner end having an inverted L-shape providing a span portion extending laterally inward of said medial portion and downwardly projecting terminal portion, said terminal portion having a tapped bore therein for receiving the threads of a rotatable bolt projecting through said bore for adjustable engagement with the inner surface of said hull beneath said tubular gunwale, said strap outer end being in engagement with the outer surface of said hull beneath said tubular gunwale, there being an elongate load carrying base member integrally attached to and extending laterally outward of said strap medial portion.

2. A bracket according to claim 1 wherein said elongate base member carries thereon a set of concentrically positioned clamp elements for engaging the base of a lantern.

3. A bracket according to claim 1 wherein a support strut extends between and is integrally attached to both said strap outer end and said base member.

* * * * *